United States Patent
Sollenberger et al.

(10) Patent No.: US 7,917,132 B2
(45) Date of Patent: Mar. 29, 2011

(54) DIRECT MEMORY DOWNLOAD IN A VOICE DATA AND RF INTEGRATED CIRCUIT AND METHOD FOR USE THEREWITH

(75) Inventors: Nelson R. Sollenberger, Farmingdale, NJ (US); Weidong Li, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 1078 days.

(21) Appl. No.: 11/706,461

(22) Filed: Feb. 15, 2007

(65) Prior Publication Data

US 2008/0146266 A1 Jun. 19, 2008

Related U.S. Application Data

(60) Provisional application No. 60/875,674, filed on Dec. 18, 2006.

(51) Int. Cl.
*H04M 1/00* (2006.01)
(52) U.S. Cl. .......... 455/418; 455/550.1; 710/22
(58) Field of Classification Search ......... 455/418, 455/419, 550.1; 370/465, 310, 402; 710/5, 710/6, 22, 23, 24, 25
See application file for complete search history.

(56) References Cited

U.S. PATENT DOCUMENTS

| | | | |
|---|---|---|---|
| 6,434,645 B1 * | 8/2002 | Parvin et al. | 710/72 |
| 7,139,848 B1 * | 11/2006 | Murray et al. | 710/22 |
| 2005/0058152 A1 * | 3/2005 | Oksanen et al. | 370/465 |
| 2008/0279098 A1 * | 11/2008 | Park | 370/230 |

* cited by examiner

*Primary Examiner* — Blane J Jackson
(74) *Attorney, Agent, or Firm* — Garlick Harrison & Markison; Bruce E. Stuckman

(57) ABSTRACT

A voice data and RF integrated circuit (IC) includes an RF transceiver module that produces received data based on a received RF signal and that produces a transmitted RF signal based on transmit data. A memory module includes a first read only memory (ROM) segment for storing a first plurality of operational instructions, and a first random access memory (RAM) segment for storing a second plurality of operational instructions. A first processing module executes the plurality of operational instructions that include baseband processing to generate input data from the received data, and to produce the transmit data from input data. A first memory interface provides direct downloading of the second plurality of operational instructions from the external memory to the first RAM segment.

19 Claims, 8 Drawing Sheets

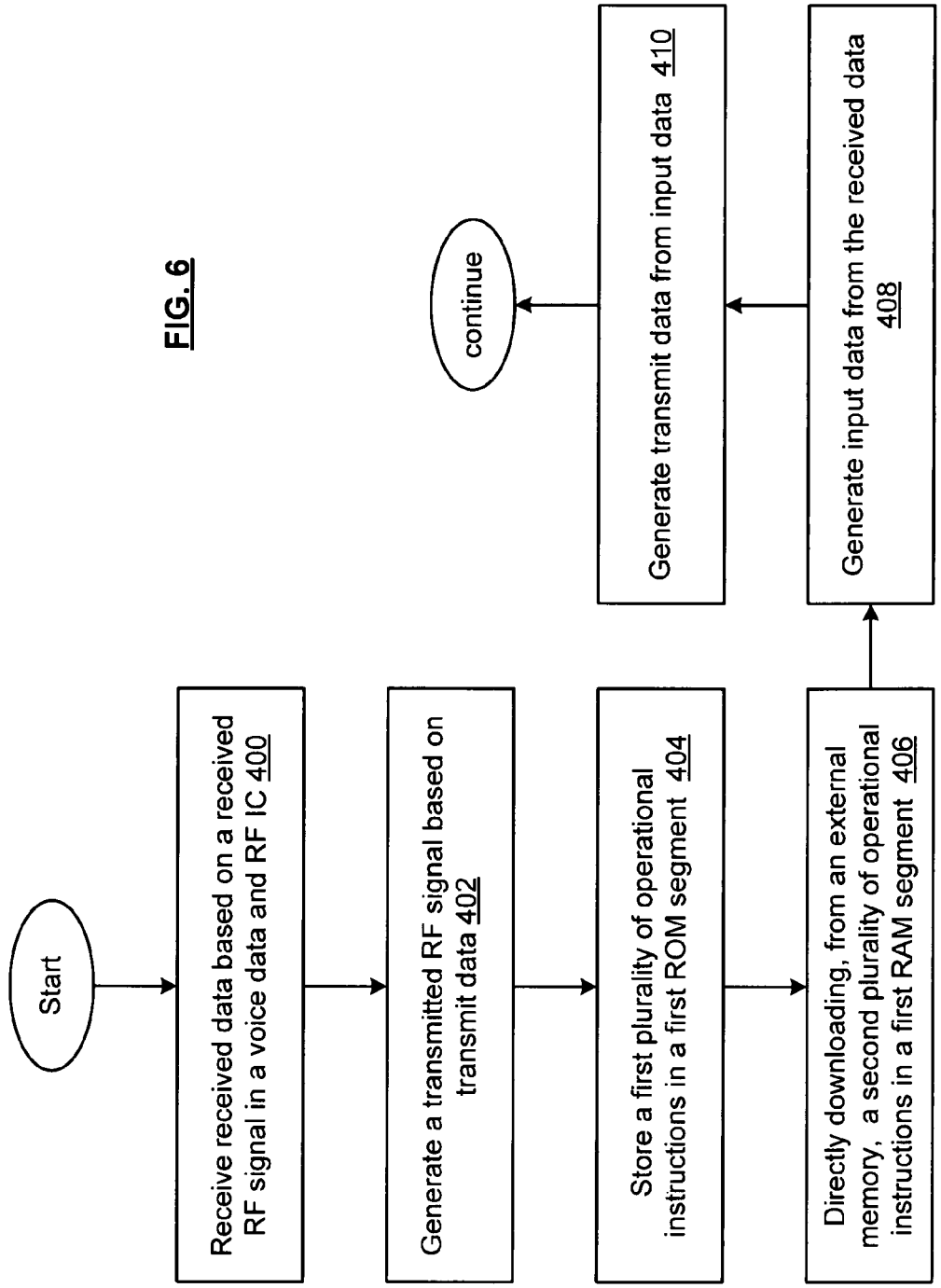

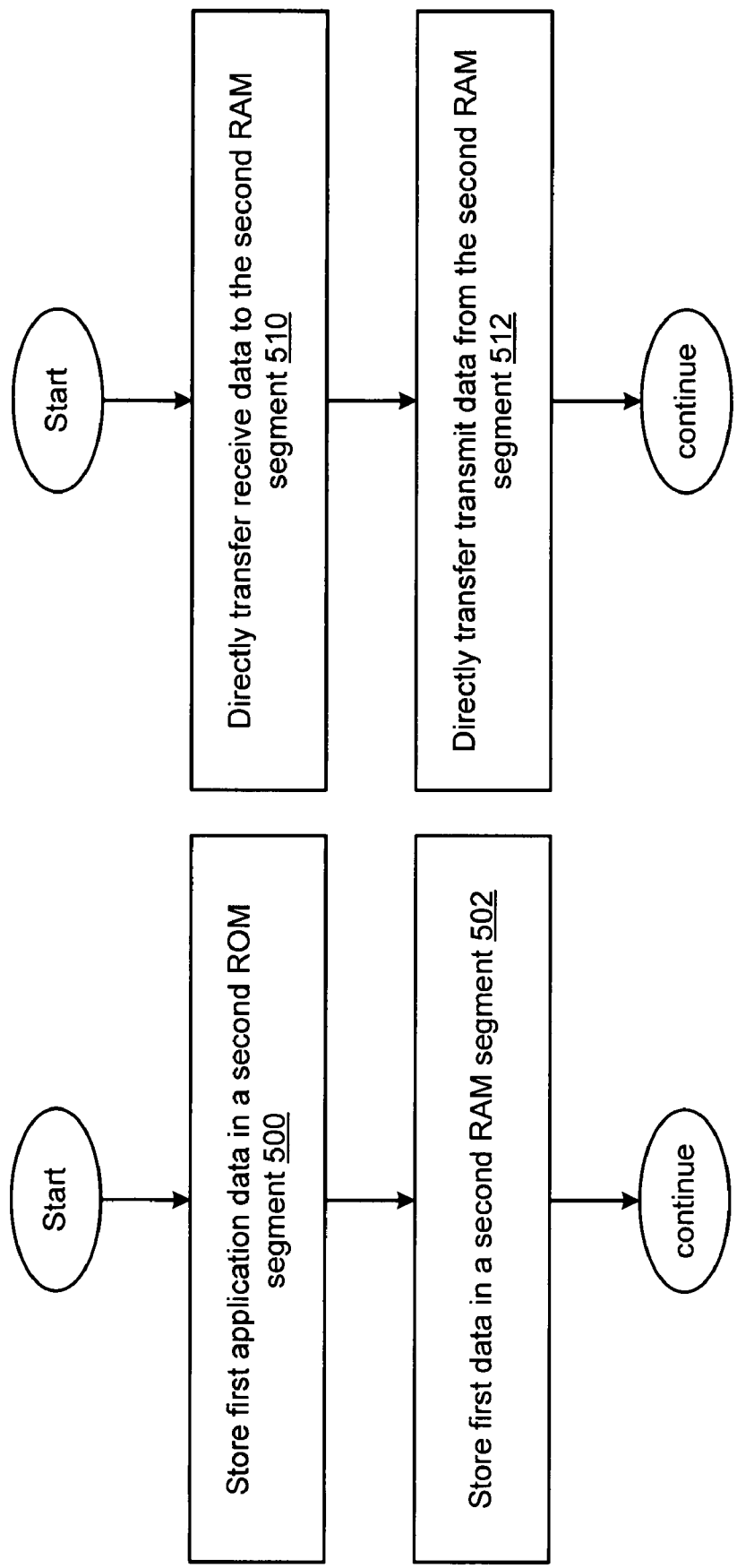

DIRECT MEMORY DOWNLOAD IN A VOICE DATA AND RF INTEGRATED CIRCUIT AND METHOD FOR USE THEREWITH

CROSS REFERENCE TO RELATED PATENTS

This invention is claiming priority under 35 USC §119(e) to a provisionally filed patent application having the same title as the present patent application, a filing date of Dec. 18, 2006, and an application number of 60/875,674.

BACKGROUND OF THE INVENTION

1. Technical Field of the Invention

This invention relates generally to mobile communication devices and more particularly to memory in a combined voice, data and RF integrated circuit used therein.

2. Description of Related Art

As is known, integrated circuits are used in a wide variety of products including, but certainly not limited to, portable electronic devices, computers, computer networking equipment, home entertainment, automotive controls and features, and home appliances. As is also known, integrated circuits include a plurality of circuits in a very small space to perform one or more fixed or programmable functions.

Memory management can be an important consideration for electronic devices. While memory has become cheaper to produce and easier to implement, more advanced and sophisticated applications can require more memory than ever before. When memory is not used wisely, it can slow the operation of a device, consume more power and/or be more costly to produce.

The advantages of the present invention will be apparent to one skilled in the art when presented with the disclosure herein.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 6 is a flow chart of an embodiment of a method in accordance with the present invention;

FIG. 7 is a flow chart of an embodiment of a method in accordance with the present invention;

FIG. 8 is a flow chart of an embodiment of a method in accordance with the present invention.

DETAILED DESCRIPTION OF THE INVENTION

Figure 1:
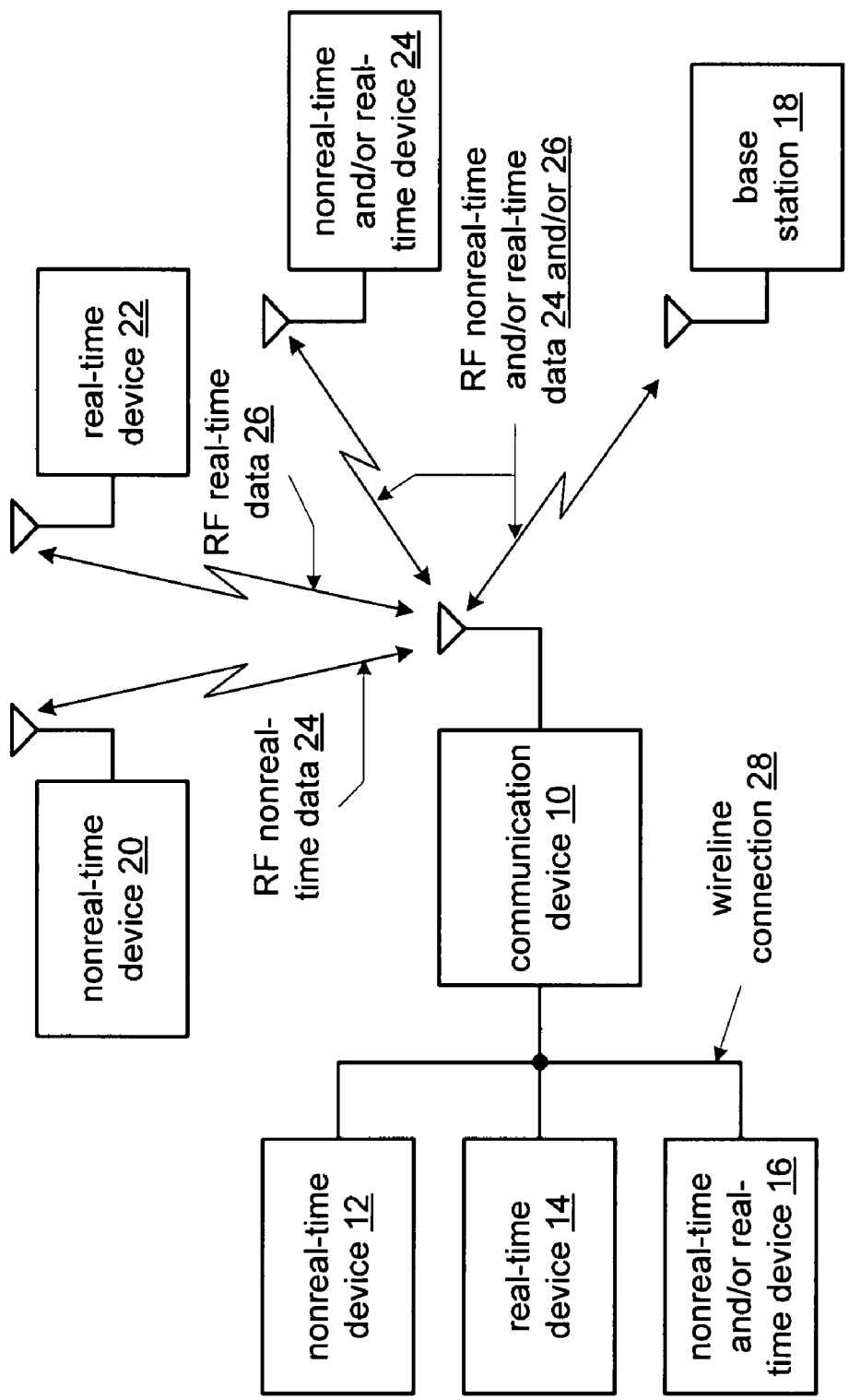
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, non-real-time device 20, real-time device 22, and non-real-time and/or real-time device 24. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-realtime data 24 includes text messaging, email, web browsing, file uploading and downloading, etc.

In an embodiment of the present invention, the communication device 10 includes an integrated circuit, such as a combined voice, data and RF integrated circuit that includes one or more features or functions of the present invention. Such integrated circuits shall be described in greater detail in association with FIGS. 3-7 that follow.

Figure 2:
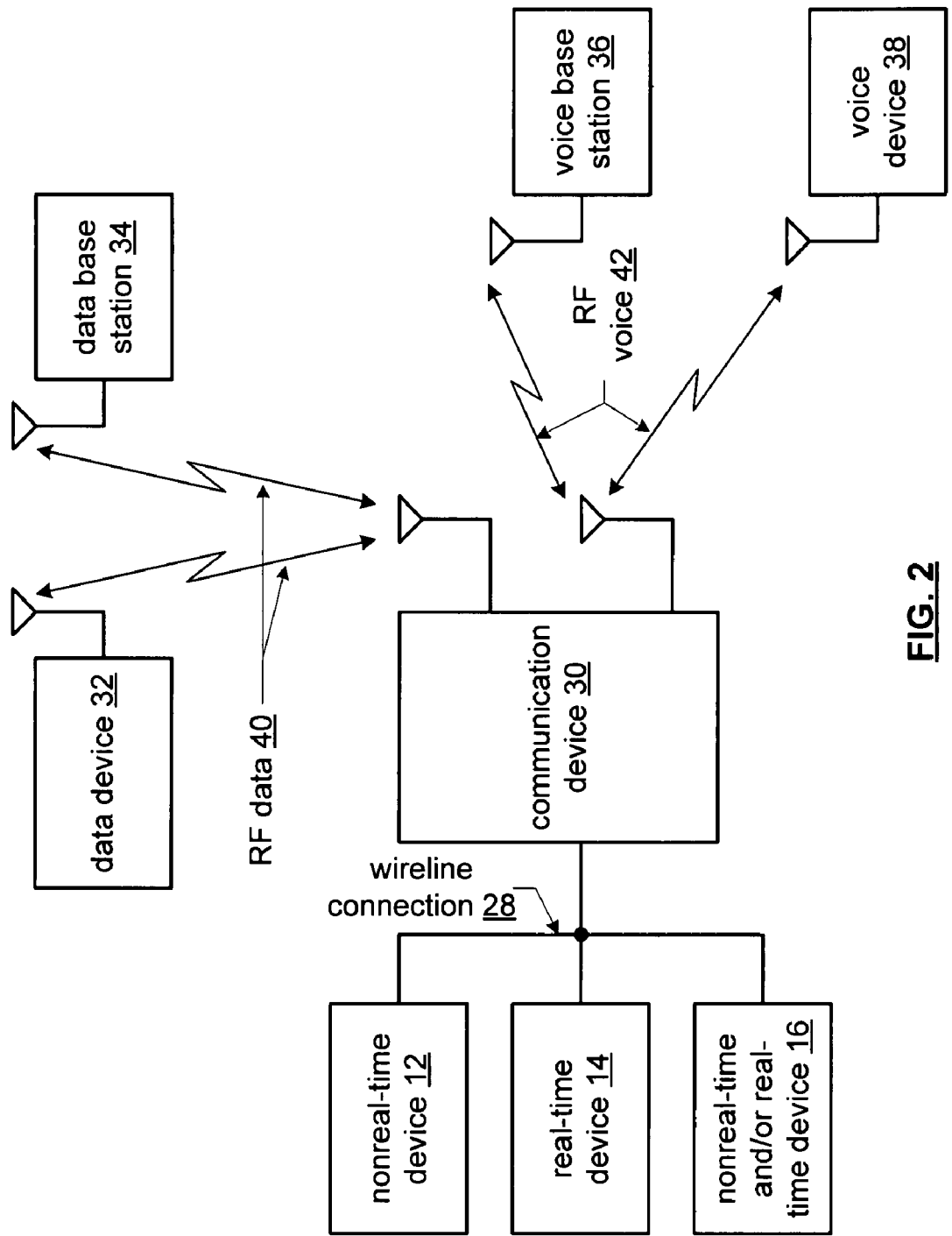
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
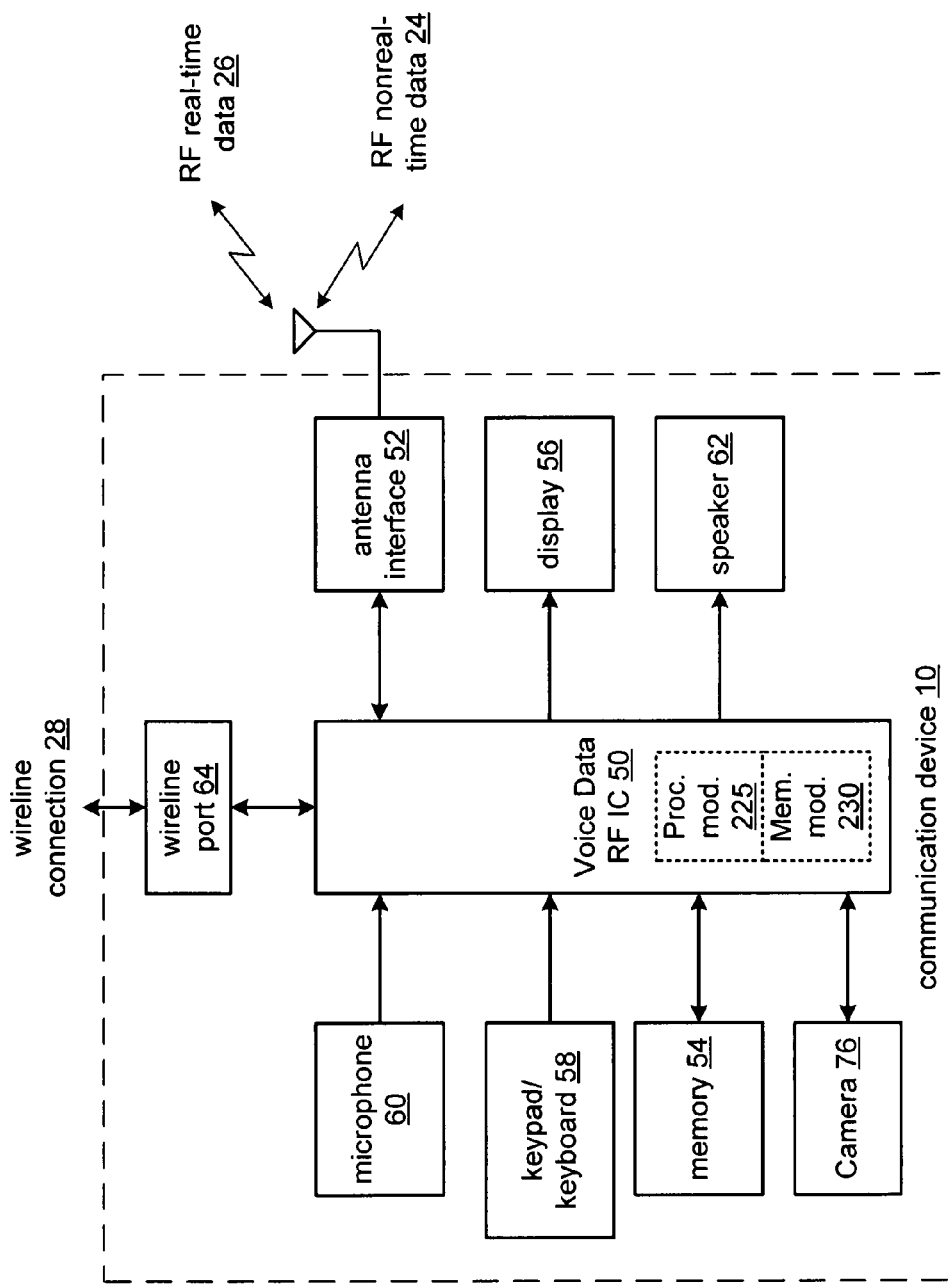
FIG. 3 is a schematic block diagram of an embodiment of an integrated circuit in accordance with the present invention.

FIG. 3 is a schematic block diagram of an embodiment of an integrated circuit in accordance with the present invention. In particular, a voice data RF integrated circuit (IC) 50 is shown that implements communication device 10 in conjunction with microphone 60, keypad/keyboard 58, memory 54, speaker 62, display 56, camera 76, antenna interface 52 and wireline port 64. In operation, voice data RF IC 50 includes RF and baseband modules for formatting and modulating data into RF real-time data 26 and non-real-time data 24 and transmitting this data via an antenna interface 52 and antenna. In addition, voice data RF IC 50 includes the appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

In an embodiment of the present invention, the voice data RF IC is a system on a chip integrated circuit that includes at least one processing device. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device for storing digital information. Note that when the Voice Data RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the voice data RF IC 50 executes operational instructions that implement one or more of the applications (real-time or non-real-time) attributed to communication devices 10 and 30 as discussed in conjunction with FIGS. 1 and 3. Voice data RF IC 50 particularly includes a digital signal processor (DSP) subsystem that includes processing module 225 and memory module 230 that receives data from an RF module and provides baseband processing to produce input data. In addition, this DSP subsystem accepts output data and provides baseband processing to generate output data to the RF module. Further details regarding the operation of the DSP subsystem will be described in greater detail in conjunction with FIGS. 5-9 that follow.

Figure 4:
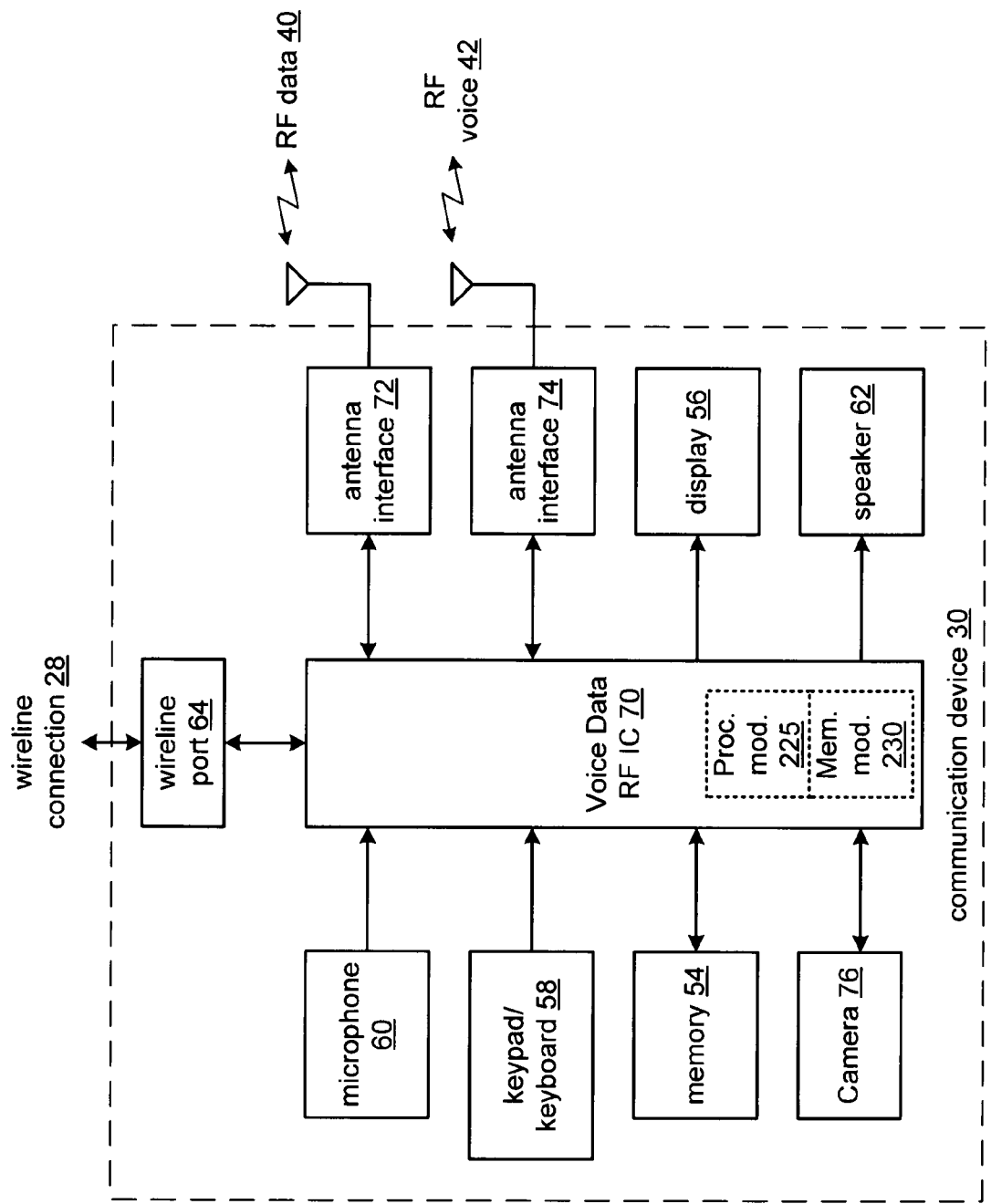
FIG. 4 is a schematic block diagram of another embodiment of an integrated circuit in accordance with the present invention.

FIG. 4 is a schematic block diagram of another embodiment of an integrated circuit in accordance with the present invention. In particular, FIG. 4 presents a communication device 30 that includes many common elements of FIG. 3 that are referred to by common reference numerals. Voice data RF IC 70 is similar to voice data RF IC 50 and is capable of any of the applications, functions and features attributed to voice data RF IC 50 as discussed in conjunction with FIG. 3. However, voice data RF IC 70 includes two separate wireless transceivers for communicating, contemporaneously, via two or more wireless communication protocols via RF data 40 and RF voice signals 42.

In operation, the voice data RF IC 70 executes operational instructions that implement one or more of the applications (real-time or non-real-time) attributed to communication device 10 as discussed in conjunction with FIG. 1. Further, RF IC 70 includes a digital signal processing subsystem in accordance with the present invention that will be discussed in greater detail in association with FIGS. 5-9.

Figure 5:
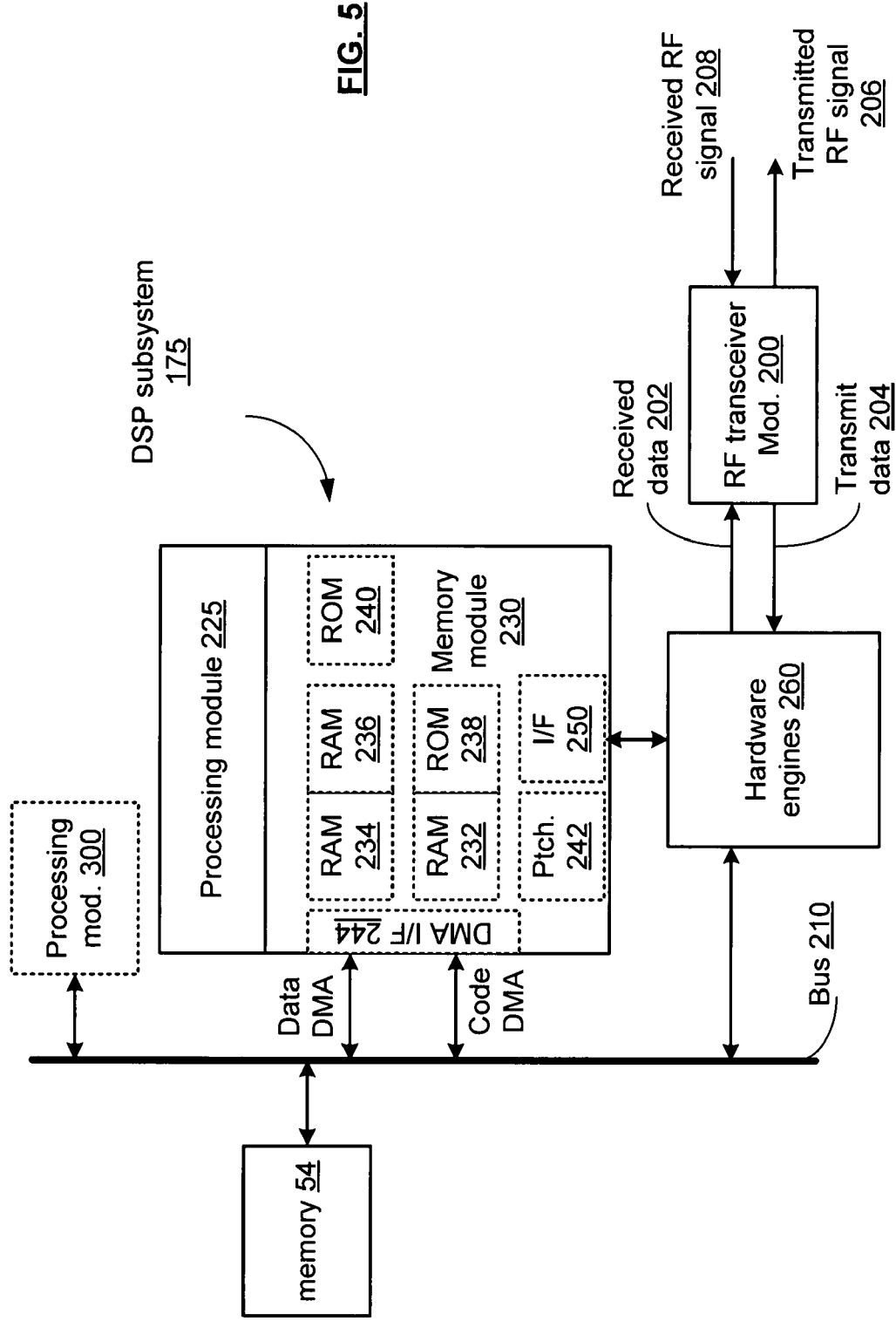
FIG. 5 is a more detailed schematic block diagram of an embodiment of a digital signal processing subsystem of an integrated circuit.

FIG. 5 is a more detailed schematic block diagram of an embodiment of a digital signal processing subsystem 175 of an integrated circuit. In particular, a voice data and RF integrated circuit (IC), such as Voice data RF IC 50 or 70 includes an RF transceiver module 200 that produces received data 202 based on a received RF signal 208 such as from antenna interface 52, 72 or 74 and that produces a transmitted RF signal 206 based on transmit data 204 in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. The DSP subsystem 175 includes a memory module 230 that includes a first read only memory (ROM) segment 238 for storing a first plurality of operational instructions, and a first random access memory (RAM) segment 232 for storing a second plurality of operational instructions. The voice data and RF IC further includes bus 210 for providing data flow between various modules of the voice data and RF IC and with external devices such as memory 54 optionally through an additional memory interface (not expressly shown), an optional second processing module 300 for executing the applications associated with voice data RF IC, for controlling the protocol stack and performing and/or controlling other functions of communication device 10 and/or 30.

In operation, the processing module 225 executes the plurality of operational instructions to perform baseband processing that generates input data from the received data 202 to be shared with one or more applications of the voice data RF IC 50 and/or 70. In addition, DSP subsystem 175 produces the transmit data 204 from output data received from the application or applications. In particular, such baseband processing can include digital transmit/receive functions that include, but are not limited to, digital basedband to intermediate frequency (IF) conversion, IF to baseband conversion, modulation/demodulation, mapping/demapping, puncturing/depuncturing, coding/decoding, and/or scrambling/descrambling.

In addition, this architecture provides a memory interface, such as DMA interface 244 or other interface that provides direct downloading of the second plurality of operational instructions from the external memory 54 to the first RAM segment. In a particular embodiment of the present invention, a direct memory access (DMA) channel is provided to facilitate such DMA transfers of program code from the external memory 54 to the memory module 230, via DMA commands. This memory interface can further include one or more memory registers of memory 54 and/or memory module 230 for storing DMA commands and operational instructions executed by DMA interface 244 of memory module 230 to transfer the program code using DMA commands as described above.

In an embodiment of the present invention, the memory module includes a second read only memory (ROM) segment 240 for storing baseband processing data, and a second random access memory (RAM) segment 234 for storing first data, wherein the first data includes at least one of transmit data, receive data, input data and output data and or other intermediate results used in the baseband processing. A second memory interface, also implemented in DMA interface 244, transfers receive data to the second RAM segment and transfers transmit data from second RAM segment. Further, memory module includes a third random access memory (RAM) segment 236 for storing second data, wherein the second data includes at least one or transmit data, receive data, input data and output data, and wherein the processing module parallel processes the first data and the second data. For instance, RAM 234 can store an X value and RAM 236 can store a Y value such that parallel processing can be used to compute a value for the product XY, etc. The baseband processing data can include wave tables such as sine and cosine tables, filter coefficients and other constants, fixed parameters and look-up tables used in baseband processing.

Memory module 230 further includes a patch code RAM section for providing corrections that may be required to the ROM program code or data stored on ROM 238 or 240. As shown, one or more hardware engines 260 are included that facilitate the transfer of received data 202 and transmit data 204 between the DSP subsystem 175 and the RF transceiver module 200, and that perform other functions, such as coding and decoding, equalization, audio processing, encryption, event timing, pulse code modulation, a command interface to the RF transceiver module 200, audio and/or voice processing, and other processing functions, either real-time or otherwise. Memory module 230 further includes an interface 250, for providing transfers of data directly between DSP subsystem 175 and hardware engines 260. In an embodiment of the present invention, the interface 250 provides a high-speed interface that can handle realtime data streams.

In an embodiment of the present invention, processing module 225 can includes at least one processing device. Such a processing device may be a microprocessor, micro-controller, digital signal processor, microcomputer, central processing unit, field programmable gate array, programmable logic device, state machine, logic circuitry, digital circuitry, and/or any device that manipulates signals (analog and/or digital) based on operational instructions stored in an associated memory such as integrated memory module 230. Portions of the memory device may be a volatile memory, non-volatile memory, static memory, dynamic memory, flash memory, and/or any device for storing digital information. Note that when the processing module 225 implements one or more of its functions via a state machine, digital circuitry, and/or logic circuitry, the associated memory storing the corresponding operational instructions for this circuitry is embedded with the circuitry comprising the state machine, analog circuitry, digital circuitry, and/or logic circuitry.

FIG. 6 is a flow chart of an embodiment of a method in accordance with the present invention. In particular, a method is presented for use in conjunction with one or more of the functions and features described in conjunction with FIGS. 1-5. In step 400, received data is received based on a received RF signal. In step 402, a transmitted RF signal is generated based on transmit data. In step 404, a first plurality of operational instructions are stored in a first read only memory (ROM) segment. In step 406, a second plurality of operational instructions are directly downloaded from an external memory to a first random access memory (RAM) segment. In step 408, input data is generated from the received data. In step 410, the transmit data is generated from input data. In an embodiment of the present invention, step 406 includes a direct memory access (DMA) transfer.

FIG. 7 is a flow chart of an embodiment of a method in accordance with the present invention. In particular, a method is presented for use in conjunction with the method of FIG. 6 and one or more of the functions and features described in conjunction with FIGS. 1-5. In step 500, baseband processing data are stored in a second read only memory (ROM) segment. In step 502, first data is stored in a second random access memory (RAM) segment, wherein the first data includes at least one of transmit data, receive data, input data and output data. In an embodiment of the present invention, the baseband processing data includes at least one of filter coefficients, a wave table, and a look-up table.

FIG. 8 is a flow chart of an embodiment of a method in accordance with the present invention. In particular, a method is presented for use in conjunction with the method of FIG. 7 and one or more of the functions and features described in conjunction with FIGS. 1-6. In step 510 receive data is directly transferred to the second RAM segment. In step 512, transmit data are directly transferred from second RAM segment. In an embodiment of the present invention, steps 510 and/or step 512 include a direct memory access (DMA) transfer.

Figure 9:
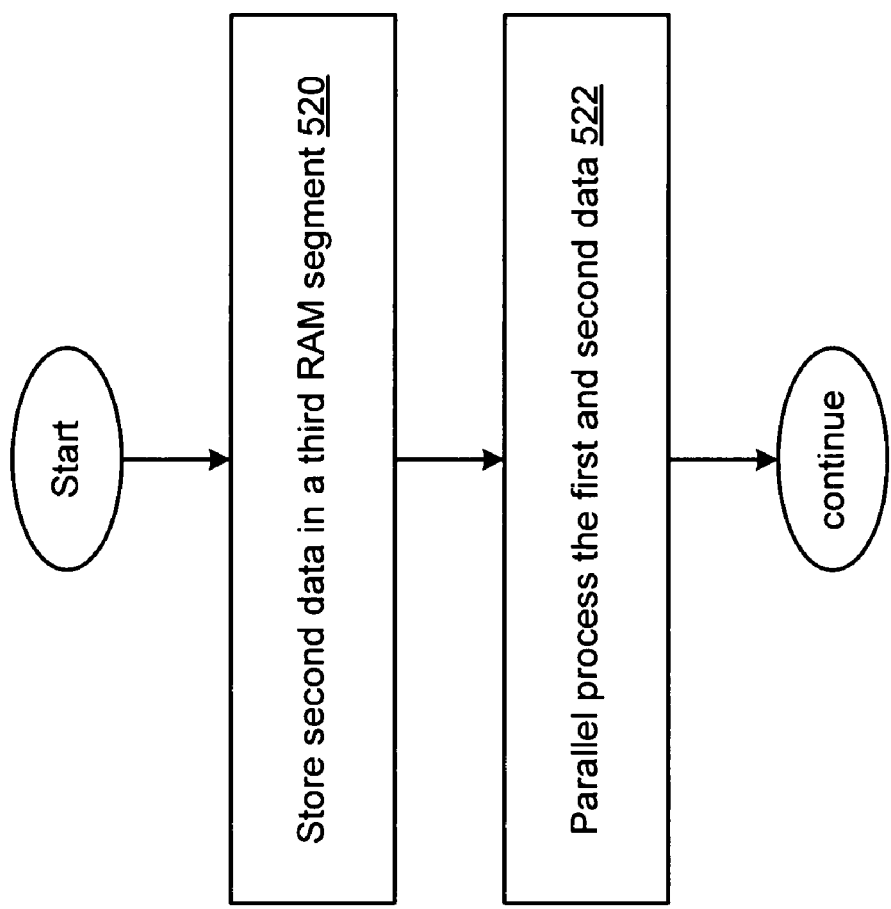
FIG. 9 is a flow chart of an embodiment of a method in accordance with the present invention.

FIG. 9 is a flow chart of an embodiment of a method in accordance with the present invention. In particular, a method is presented for use in conjunction with the method of FIG. 7 and one or more of the functions and features described in conjunction with FIGS. 1-6 and 8. In step 520, second data are stored in a third random access memory (RAM) segment, wherein the second data includes at least one or transmit data, receive data, input data and output data. In step 522, the first data and the second data are processed in parallel.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A voice data and RF integrated circuit (IC) comprising:
    an RF transceiver module that produces received data based on a received RF signal and that produces a transmitted RF signal based on transmit data;
    a memory module that includes a first read only memory (ROM) segment for storing a first plurality of operational instructions, a first random access memory (RAM) segment for storing a second plurality of operational instructions, a second read only memory (ROM) segment for storing baseband processing data, and a second random access memory (RAM) segment for storing first data; and
    a first processing module, coupled to the memory module, that executes the plurality of operational instructions that include baseband processing to generate input data from the received data, and to produce the transmit data from input data;
    a first memory interface, coupled to the memory module, an external memory and the first processing module, the first memory interface providing direct downloading of the second plurality of operational instructions from the external memory to the first RAM segment;
    a second memory interface, coupled to the memory module, the external memory and the first processing module, the second memory interface providing transfers of receive data to the second RAM segment and transfers of transmit data from second RAM segment;
    wherein the first data includes at least one of transmit data, receive data, input data and output data.

2. The voice data and RF integrated circuit (IC) of claim 1 wherein the first memory interface includes a direct memory access (DMA) channel.

3. The voice data and RF integrated circuit (IC) of claim 1 wherein the second memory interface includes a direct memory access (DMA) channel.

4. The voice data and RF integrated circuit (IC) of claim 1 wherein the memory module includes a third random access memory (RAM) segment for storing second data, wherein the second data includes at least one or transmit data, receive data, input data and output data, and wherein the processing module parallel processes the first data and the second data.

5. The voice data and RF integrated circuit (IC) of claim 1 wherein the baseband processing data includes at least one of filter coefficients, a wave table, and a look-up table.

6. The voice data and RF integrated circuit (IC) of claim 1 further comprising:
    at least one hardware engine, coupled to the processing module, that provides at east one real-time function.

7. A voice data and RF integrated circuit (IC) comprising:
    an RF transceiver module that produces received data based on a received RF signal and that produces a transmitted RF signal based on transmit data;
    a memory module that includes a first read only memory (ROM) segment for storing a first plurality of operational instructions, and a first random access memory (RAM) segment for storing a second plurality of operational instructions; and
    a first processing module, coupled to the memory module, that executes the plurality of operational instructions that include baseband processing to generate input data from the received data, and to produce the transmit data from input data;
    a first memory interface, coupled to the memory module, an external memory and the first processing module, the first memory interface providing direct downloading of the second plurality of operational instructions from the external memory to the first RAM segment;
    wherein the memory module includes a second read only memory (ROM) segment for storing baseband processing data, and a second random access memory (RAM) segment for storing first data, wherein the first data includes at least one of the transmit data, the receive data, the input data and the output data.

8. The voice data and RF integrated circuit (IC) of claim 7 wherein the first memory interface includes a direct memory access (DMA) channel.

9. The voice data and RF integrated circuit (IC) of claim 7 further comprising
    a second memory interface, coupled to the memory module, the external memory and the first processing module, the second memory interface providing transfers of receive data to the second RAM segment and transfers of transmit data from second RAM segment.

10. The voice data and RF integrated circuit (IC) of claim 9 wherein the second memory interface includes a direct memory access (DMA) channel.

11. The voice data and RF integrated circuit (IC) of claim 7 wherein the memory module includes a third random access memory (RAM) segment for storing second data, wherein the second data includes at least one or transmit data, receive data, input data and output data, and wherein the processing module parallel processes the first data and the second data.

12. The voice data and RF integrated circuit (IC) of claim 7 wherein the baseband processing data includes at least one of filter coefficients, a wave table, and a look-up table.

13. The voice data and RF integrated circuit (IC) of claim 7 further comprising:
  at least one hardware engine, coupled to the processing module, that provides at least one real-time function.

14. A method for use in a voice data and RF integrated circuit (IC) comprising:
  receiving received data based on a received RF signal;
  generating a transmitted RF signal based on transmit data;
  storing a first plurality of operational instructions m a first read only memory (ROM) segment;
  directly downloading a second plurality of operational instructions from an external memory to a first random access memory (RAM) segment;
  generating input data from the received data;
  generating the transmit data from input data;
  storing baseband processing data in a second read only memory (ROM) segment; and
  storing first data in a second random access memory (RAM) segment, wherein the first data includes at least one of the transmit data, the receive data, the input data and the output data.

15. The method of claim 14 wherein the step of directly downloading the second plurality of operational instructions includes a direct memory access (DMA) transfer.

16. The method of claim 14 further comprising
  directly transferring receive data to the second RAM segment; and
  directly transferring transmit data from second RAM segment.

17. The method of claim 16 wherein the steps of directly transferring the receive data and directly transferring the transmit data include a direct memory access (DMA) transfer.

18. The method of claim 14 further comprising the steps of:
  storing second data in a third random access memory (RAM) segment, wherein the second data includes at least one or transmit data, receive data, input data and output data; and
  parallel processing the first data and the second data.

19. The method of claim 14 wherein the baseband processing data includes at least one of filter coefficients, a wave table, and a look-up table.

* * * * *

UNITED STATES PATENT AND TRADEMARK OFFICE
CERTIFICATE OF CORRECTION

| | | |
|---|---|---|
| PATENT NO. | : 7,917,132 B2 | |
| APPLICATION NO. | : 11/706461 | |
| DATED | : March 29, 2011 | |
| INVENTOR(S) | : Sollenberger et al. | |

It is certified that error appears in the above-identified patent and that said Letters Patent is hereby corrected as shown below:

Col. 8, line 13, in claim 1: after "from" insert --the--
Col. 9, line 2, in claim 9: after "from" insert --the--
Col. 9, line 9, in claim 11: replace "one or" with --one of--
Col. 9, line 24, in claim 14: replace "m" with --in--
Col. 10, line 14, in claim 16: after "from" insert --the--

Signed and Sealed this
Second Day of October, 2012

David J. Kappos
*Director of the United States Patent and Trademark Office*